United States Patent [19]

Mark et al.

[11] 4,380,612
[45] Apr. 19, 1983

[54] HIGH HEAT DISTORTION RESISTANT SEGMENT ESTER POLYCARBONATES

[75] Inventors: Victor Mark, Evansville, Ind.; Frederick F. Holub, Schenectady, N.Y.; Charles V. Hedges, Mt. Vernon, Ind.

[73] Assignee: General Electric, Mt. Vernon, Ind.

[21] Appl. No.: 332,863

[22] Filed: Dec. 21, 1981

[51] Int. Cl.$^3$ .............................................. C08G 63/64
[52] U.S. Cl. .................................... 525/439; 525/444; 525/466; 528/176; 528/191; 528/193; 528/371; 528/372; 528/194; 528/370
[58] Field of Search ............... 528/176, 191, 193, 194, 528/370–372; 525/439, 444, 462

[56] References Cited

U.S. PATENT DOCUMENTS

| | | |
|---|---|---|
| 3,220,977 | 11/1965 | Jackson, Jr. et al. ............... 528/176 |
| 3,395,186 | 7/1968 | Matzner et al. ..................... 528/176 |
| 3,408,407 | 10/1968 | Cotter et al. ......................... 528/176 |
| 4,156,069 | 5/1979 | Prevorsek et al. .................. 528/176 |
| 4,238,597 | 12/1980 | Markezich et al. ................. 528/176 |

*Primary Examiner*—Lester L. Lee
*Attorney, Agent, or Firm*—Martin B. Barancik; William F. Mufatti

[57] ABSTRACT

Segment-ester polycarbonates have improved resistance to high heat distortion when portions of the polymer contain units derived from 4,4'-cyclohexylidenediphenol and derivatives thereof. Preferred high heat distortion segment-ester polycarbonates include the copolyestercarbonate with segments derived from isophthalic acid and 4,4'-cyclohexylidenediphenol and/or terephthalic acid and 4,4'-cyclohexylidenediphenol. Films made of the segment-ester copolycarbonates have improved resistance to high heat distortion.

16 Claims, No Drawings

HIGH HEAT DISTORTION RESISTANT SEGMENT ESTER POLYCARBONATES

This invention relates to segment-ester polycarbonates and more particularly, to segment-ester polycarbonates having resistance to high heat distortion.

BACKGROUND OF THE INVENTION

Segment-ester polycarbonates can be formed into articles of various shapes including thin films. It is also desirable to provide segment-ester polycarbonates having improved resistance to high heat distortion thereby enabling these segment-ester polycarbonates to be used in forming objects that will be exposed to an elevated temperature environment, such as components exposed to automobile and aircraft applications, automobile headlamps, and the like.

Polycarbonate compositions having resistance to high heat distortion are disclosed in U.S. Pat. No. 4,180,651. This property is imparted to the high molecular weight aromatic polycarbonate resins by controlling the degree to which particular diphenols are halogenated so that there are obtained either highly pure dihalogenated diphenols or predetermined statistical mixtures comprising predominently mono and di- halogenated diphenols together with some unreacted diphenol. However, there is no suggestion of high molecular weight, segment-ester polycarbonates or the resistance of said segment-ester polycarbonates to high heat distortion when they contain moieties, fractions or portions of the bisphenol of cyclohexanone shown herein.

Among the copolyester-carbonates and the methods for preparing them which are known in the prior art, are those disclosed in U.S. Pat. No. 4,189,549 which discloses polyestercarbonate compositions which are obtained from a melt polymerization process employing para-hydroxy benzoic acid.

In general, the prior art references recognize that resistance to high heat distortion can be imparted to polymer compositions by manipulating and altering the building blocks from which the polymers are obtained and further recognizes that certain polycarbonate compositions have resistance to high heat distortion when halogenated bisphenols (diphenols) are used in the building block. However, these references do not disclose or suggest that a high molecular weight segment-ester polycarbonate composition having resistance to high heat distortion can be obtained by incorporating specific bisphenol moieties, fractions or portions as the bisphenol-carbonate moiety, or portion in a segment-ester polycarbonate composition.

SUMMARY OF THE INVENTION

Accordingly, it is the primary object of the present invention to provide segment-ester polycarbonate compositions having resistance to high heat distortion.

It is another object of this invention to provide segment-ester polycarbonate compositions wherein the bisphenol carbonate moieties or portions thereof can be altered to impart resistance to high heat distortion to the segment-ester polycarbonate composition.

Still another object of this invention is to provide a segment-ester polycarbonate composition having resistance to high heat distortion which can be blended with other polymers and copolymers to improve the resistance to high heat distortion of said polymers and copolymers.

It has now been found that high molecular weight segment-ester polycarbonate compositions have resistance to high heat distortion when the composition comprises bisphenol-ester units or moieties and bisphenol-carbonate units or moieties, said bisphenol carbonate units or moieties having the general formula:

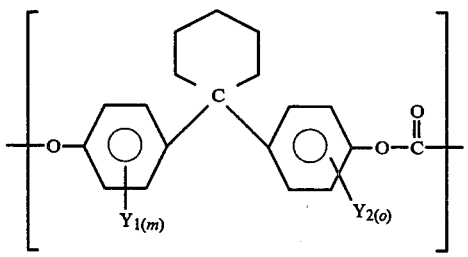

wherein $Y_1$ and $Y_2$ are the same or different and are selected from an alkyl radical; m and o are the same or different and are 0, 1 or 2. General formula (I) above is derived from 4,4'-cyclohexylidenediphenol itself and alkyl derivatives thereof. Preferred alkyl radicals include alkyl radicals having from 1 to 4 carbon atoms.

As discussed in more detail below, segment-ester polycarbonate blends and mixtures, both physical and chemical, of the segment-ester polycarbonates of the present invention can also be prepared to impart resistance to high heat distortion to the blend or mixture.

The ester units in the segment-ester polycarbonate of the present invention may be derived from the bisphenol shown in formula I and an aromatic dicarboxylic acid. The ester units are essential in the formation of the segment-ester polycarbonate polymer having resistance to high heat distortion. The ester units are aromatic ester units having the general formula:

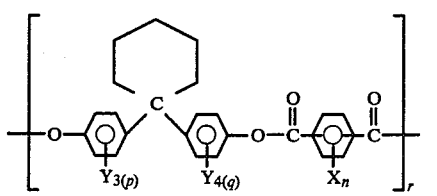

wherein $Y_3$ and $Y_4$ are the same or different and are alkyl, preferably alkyl of one to four carbon atoms, inclusive; p and q are the same or different and are 0, 1 or 2; X is a substitutent independently selected from the group consisting of chlorine, fluorine, bromine and an alkyl radical of one to four carbon atoms, inclusive; n is an integer of zero to four; and r is an integer of 2 to about 20.

The particular method by which the copolyester-carbonate compositions of the present invention are prepared depends upon the type of segment-ester polycarbonate polymer desired. Generally speaking, the compositions of the invention are prepared by reacting a diphenol, defined herein as the diphenol or bisphenol portion, moiety or fraction of the copolymer composition, said diphenol or bisphenol having the formula:

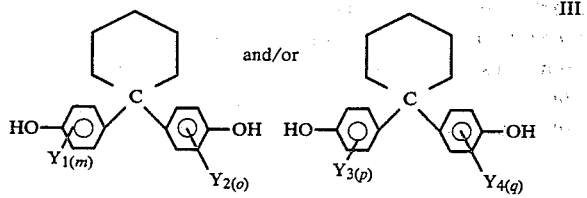

wherein $Y_1$, $Y_2$, $Y_3$, $Y_4$, (m), (o), (p) and (q) are the same as defined above, with a carbonate precursor and a diester precursor. Thus, as used herein, the bisphenol moieties or units in the segment-ester polycarbonate composition of the present invention are derived from formula III, and optionally, from the bisphenol of formula III and other conventional bisphenol units in the copolymer. The bisphenol-carbonate units or moieties of formula I are derived from the bisphenol of formula III and the carbonate precursor.

The bisphenol of formula III, and optionally other conventional bisphenol units based in conjunction with the bisphenol of formula III, is reacted with a carbonate precursor, such as, for example, phosgene, and a difunctional acid monomer such as, for example, an aromatic dicarboxylic acid dihalide. The methods of polymerization include solution polymerization, interfacial polymerization, melt polymerization, and the like, and other conventional polymerization methods as defined in the prior art, in which cases other ester and carbonate precursors, such as esters are used as well known to those skilled in the art.

The segment-ester polycarbonates of the present invention may also have other structural components. These components include alternating ester and carbonate units, random copolymers of said units, block copolymers of said units and the like. Furthermore, the present invention also embraces blends of the polyester-carbonate copolymer compositions derived from the bisphenols as described in formula III above. Physical blends and mixtures with other segment-ester polycarbonates, with polyesters, with polycarbonates, and blends and mixtures with other polymers, copolymers and the like, are embraced by the present invention. Chemical mixtures include polymers in which differing ester and/or carbonate polymers are joined by chemical bonds.

DESCRIPTION OF THE PREFERRED EMBODIMENTS

In the present invention, resistance to high heat distortion is imparted to high molecular weight, polycarbonate compositions by selecting or preparing diphenols having one or a combination of the structures defined in formula III above to be used with a carbonate precursor and an appropriate difunctional ester precursor, in the polymerization reaction to yield segmented compositions. This is achieved by using 4,4'-cyclohexylidene diphenol and/or alkyl derivatives thereof as bisphenol units in the polymer. At least a part of the bisphenol units in the segment-ester polycarbonate of the present invention must have the structure of formula III above.

The cyclohexylidene diphenol and derivatives thereof can be easily obtained by conventional condensation techniques well-known in the art. Typical examples of the 4,4'-cyclohexylidene diphenols which may be used in accordance with the present invention include 4,4'-cyclohexylidene diphenol itself; 4,4'-cyclohexylidenebis(2-methylphenol); 4,4'-cyclohexylidenebis(2-ethylphenol); 4,4'-cyclohexylidenebis(2-butylphenol); 4,4'-cyclohexylidenebis(2,6-xylenol); and the like. As discussed above, the derivatives of 4,4'-cyclohexylidene diphenol include the mono-, di-, tri-, and tetra- alkyl derivatives, comprising methyl, ethyl, propyl, isopropyl, butyl, isobutyl, sec.-butyl, tert.- butyl and their combinations.

Optionally, other diphenols or bisphenols can be used in conjunction with the 4,4'-cyclohexylidenediphenol and derivatives thereof to make the segment-ester polycarbonates of the present invention. Other diphenols which can also be used in conjunction with the 4,4'-cyclohexylidene diphenol monomers include bisphenol-A and their derivatives and analogs.

Polymeric derivatives of a dihydric phenol, a dicarboxylic acid and carbonic acid are disclosed in U.S. Pat. No. 3,169,121 and the diphenols disclosed therein may be used to make the segment-ester polycarbonates of the present invention as long as there is sufficient bisphenol monomer of formula III and aromatic dicarboxylic ester component II in the polymer to impart resistance to high heat distortion.

The carbonate precursor employed with the bisphenol monomer or monomers and the ester precursor to make the segment-ester polycarbonate can be either a carbonyl halide, a carbonate ester or a haloformate depending upon the polymerization process used to make the copolyester-carbonate copolymer of the invention. The carbonyl halides which can be employed, include carbonyl bromide, carbonyl chloride and mixtures thereof. Typical of the carbonate esters which can be employed are diphenyl carbonate, di(halophenyl) carbonates such as, di-(chlorophenyl)carbonate, di-(bromophenyl)carbonate, di-(trichlorophenyl)carbonate, di-(tribromophenyl)carbonate, and the like; di-(alkylphenyl)carbonate such as di-(tolyl)carbonate, and the like; di-(naphthyl)carbonate, di-(chloronaphthyl)-carbonate, phenyl tolyl carbonate, chlorophenyl chloronaphthyl carbonate, and the like, or mixtures thereof. The haloformates suitable for use herein include phenyl chloroformate and bishaloformates of dihydric phenols (bischloroformate of hydroquinone, bischloroformate of BPA, and the like) or glycols (bishaloformates of ethylene glycol, neopentyl glycol, polyethylene glycol, and the like). While other carbonate precursors will occur to those skilled in the art, carbonyl chloride, also known as phosgene, is preferred.

The ester precursor, otherwise defined in the segment-ester polycarbonate composition as ester units or moieties which have been copolymerized with the bisphenol-carbonate carbonate units, including blocks thereof, having general formula II above, can be, for example, dicarboxylic acid dihalides, dicarboxylic acid monohalides and dicarboxylic acids themselves; dicarboxylic acid diesters, dicarboxylic acid monoester monohalides, and the like, depending upon the particular process used to make the segmented-ester polycarbonates.

Suitable examples of aromatic dicarboxylic acids which can be used, per se or as their derivatives indicated above, are isophthalic acid, terephthalic acid, polynuclear aromatic acids such as 4,4'-diphenic acid, and 2,6-naphthalene dicarboxylic acid. Preferred acid derivatives are dichlorides such as isophthaloyl dichloride and terephthaloyl dichloride as well as ester derivatives such as diphenyl isophthalate and diphenyl terephthalate.

The segment-ester polycarbonates of the present invention can be prepared by processes such as interfacial polymerization or phase boundary separation, transesterification, solution polymerization, melt polymerization, interesterification, and the like. Various prior art polymerization processes are included in U.S. Pat. Nos. 3,030,331; 3,169,121; 3,207,814 and 4,188,314. Although the processes may vary, several of the preferred processes typically include dissolving or dispersing the reactants in a suitable water immiscible solvent medium and contacting the reactants with a carbonate precursor in the presence of a suitable catalyst and an aqueous caustic solution under controlled pH conditions. A molecular weight regulator, that is, a chain stopper, is generally added to the reactants prior to or during contacting them with a carbonate precursor. Useful molecular weight regulators include monohydric phenols, such as phenol, chroman-1, paratertiarybutylphenol, and the like. Techniques for the control of molecular weight are well known in the art and may be used in the present process for controlling the molecular weight of the polyester-carbonate copolymer compositions. The most commonly used, water immiscible solvents include methylene chloride, 1,2-dichloroethane, chlorobenzene, toluene and the like.

The acid acceptor employed can be either an organic or an inorganic base. A suitable organic acid acceptor, for example, is a tertiary amine and includes such materials as pyridine, triethylamine, dimethylaniline, tributylamine, and the like. The inorganic acid acceptor can be either a hydroxide, a carbonate, a bicarbonate, or a phosphate of an alkali or alkaline earth metal, commonly used as aqueous solution or slurry.

The catalysts, which can be employed if the interfacial polymerization technique is used, accelerate the rate of polymerization of the diphenol or bisphenol of formula III above, and other diphenols optionally present, with the ester precursor, such as the diacid dihalide or dibasic acid and with the carbonate precursor. Suitable catalysts include tertiary amines such as triethylamine, tripropylamine, N,N-dimethylaniline, quaternary ammonium compounds such as tetraethylammonium bromide, cetyl triethylammonium bromide, tetra-n-heptylammonium iodide, tetra-n-propylammonium bromide, tetramethylammonium chloride, and quaternary phosphonium compounds such as n-butyl-triphenyl phosphonium chloride and methyltriphenyl phosphonium bromide.

Also included herein are branched copolyester-carbonates wherein a polyfunctional aromatic compound is a co-reactant with the diphenol of formula III and/or other dihydric co-monomers in the reaction mixture, comprising also the carbonate precursor and the ester precursor, to provide a thermoplastic randomly branched copolyester-carbonate. These polyfunctional aromatic compounds contain at least three functional groups which are hydroxyl, carboxyl, carboxylic anhydride, carboxylic chloride or mixtures thereof. Examples of these polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. Preferred polyfunctional aromatic compounds are trimellitic anhydride or trimellitic acid, or their carboxylic chloride derivatives.

The proportion of carboxylate and carbonate groups present in the copolyester-carbonate copolymer compositions of the present invention can be suitably varied by varying the molar ratio of the carbonate and diester precursors. In the preparation of the copolyester-carbonate copolymer compositions of the present invention, the diphenol of formula III, and optionally other diphenols, the carbonate precursor, and the ester precursor from which the ester units are derived, can be varied depending upon the desired properties of the product.

Other well-known materials can also be employed as additives for their intended functions and include flame retardants, antistatic agents, mold release agents, thermal stabilizers, ultraviolet light stabilizers, reinforcing fillers such as glass, other inert fillers and fibers, foaming agents, and the like.

The resistance to high heat distortion is directly related to glass transition temperature (Tg), and the resistance to high heat distortion of the copolyester-carbonate copolymers of the present invention may be defined as an improvement in the glass transition temperature, that is, an increase or elevation in Tg over polycarbonates or copolyester-carbonates not including the bisphenols of formula III. The copolyester-carbonate copolymers of the present invention, having recurring units derived from the bisphenol(s) of formula III, may be used to impart improved resistance to high heat distortion to other copolyester-carbonate polymers, as well as other polymers, for example, polycarbonates, polyesters, and the like. Generally, the improved resistance to high heat distortion is exemplified by a glass transition temperature of above 150° C. (300° F.), preferably above 180° C. Specific examples showing high glass transition temperatures for various copolymers of the present invention are given in the examples below.

The heat distortion temperature, that is, heat distortion under load (HDUL), for the polyester-carbonate copolymers may be determined in accordance with ASTM-D 1637-61. The results of such tests are generally expressed in degrees at a given pressure. As is well known to those skilled in the art, glass transition temperature (Tg°) can be used in place of HDUL results, since HDUL is relatable to Tg°. Accordingly, glass transition temperatures have been measured to show the resistance to high heat distortion of the copolyester-carbonate copolymers of the present invention, and they were determined by using a Perkin-Elmer DSC-2B instrument which measures the second order transition temperature or Tg by differential scanning calorimetry. The measurements for various copolyester-carbonate copolymers made in accordance with the present invention are shown in the examples below.

The following examples are set forth to more fully and clearly illustrate the present invention and are intended to be, and should be construed as being, exemplary and not limitative of the invention. Unless otherwise stated, all parts and percentages are by weight.

EXAMPLE 1

Preparation of Segmented-Ester Polycarbonate Polymers

To a 2-liter reaction vessel, there was added 42.9 grams (0.16 moles) of 4,4'-cyclohexylidenediphenol and 8.12 grams (0.04 moles) of isophthaloyl of dichloride dissolved in methylene chloride. The reaction vessel also contained 4 mole percent (0.81 gram) of triethylamine, 2 mole percent (0.38 gram) phenol, 400 ml methylene chloride and 300 ml of water. Sodium hydroxide solution was added to the reaction vessel to maintain the pH of the formulation at about 11.0. This was accomplished by adding 20% aqueous solution of sodium hydroxide. After the segmented-ester reaction occurred, phosgene was delivered to the reaction vessel at 0.5 gram per minute for a period of 26 minutes. This represents 13 grams of phosgene (a 10% excess of phosgene). During this period, the pH of the formulation was controlled by adding the 25% aqueous solution of sodium hydroxide. Phosgene was added for an additional 3 minutes at 0.5 grams per minute rate to react with any residual 4,4'-cyclohexylidenediphenol. The layers were separated, and the methylene chloride layer was washed with 0.01 N HCl followed by two washings with water. Methanol was added to the washed solution to precipitate the polymer, which was vacuum oven dried at 60° C. The molar ratio of the product was 1 mole isophthaloyl per 2 moles of 4,4'-cyclohexylidene diphenol. The glass transition temperature of the polymer is recorded in the table below.

EXAMPLE 2

The same procedure was followed as in Example 1 except that one mole of isophthaloyl dichloride was added for 2 moles of 4,4'-cyclohexylidenediphenol by employing 34.9 grams (0.13 mole) of the 4,4'-cyclohexylidenediphenol (BPC) and 13.2 grams (0.065 mole) of isophthaloyl dichloride. About 4.0 mole percent (1.1 ml) of triethylamine, 2 mole percent (0.38 gram) of phenol, 400 ml of methylene chloride and 300 ml of water were used. The phosgene was added to the formulation at 0.5 gram per minute for 14 minutes. The layers were separated and washed as described in Example 1 and thereafter precipitated with methanol. The precipitated copolymer was oven dried. The glass transition temperature of the copolymer is reported in the Table.

EXAMPLE 3

Substantially the same procedure was followed as in Example 1, and the copolymer was prepared by an aqueous caustic copolymer reaction. To the reaction vessel, there was added 42.9 grams (0.16 mole) of 4,4'-cyclohexylidenediphenol, 4 mole percent (1.1 ml) of triethylamine, 2 mole percent (0.38 gram) of phenol, 400 ml of methylene chloride and 300 ml of water. A 25% aqueous solution of sodium hydroxide was added to adjust the pH of the formulation and thereafter to control the pH of the formulation at 11. Terephthaloyl dichloride, 0.04 mole (8.1 grams), dissolved in methylene chloride, was added dropwise to the foregoing formulation while the pH was maintained at 11 by the addition of a 25% aqueous sodium hydroxide solution. After the addition of the terephthaloyl dichloride solution was complete, phosgene was added to the formulation at 0.5 grams per minute rate for 26 minutes. The methylene chloride layer was washed with 0.01 N HCl, followed by two washings with water. The copolymer was precipitated from the washed methylene chloride layer with methanol. The precipitated copolymer was dried in a vacuum oven at about 60° C. The glass transition temperature of the polymer is reported in the Table.

TABLE

| HIGH HEAT DISTORTION POLYESTER-CARBONATES | | | |
|---|---|---|---|
| EXAMPLE | MOLAR COMPOSITIONS | Tg °C. | Tg °F. |
| 1 | 1 Iso/3 Carb/4 BPC | 184 | 363 |
| 2 | 1 Iso/1 Carb/2 BPC | 194 | 382 |
| 3 | 1 Tere/3 Carb/4 BPC | 185 | 365 |

BPC = 4,4'-cyclohexylidenediphenol component
Iso = Isophthalic acid component
Tere = Terephthalic acid component
Carb = Carbonate component Other modifications and variations of the present invention are possible in the light of the above disclosure. It is therefore, to be understood, that changes may be made in the particular embodiments described above which are in the full intended scope of the invention as defined in the appended claims.

What is claimed is:

1. A high molecular weight segment-ester polycarbonate composition comprising aromatic carbonate units and aromatic diester units, said units derived from cyclic bisphenols and said units having the general formulae I and II respectively, the molar ratio of said aromatic carbonate units to aromatic diester units being from about 1:9 to about 9:1, and mixtures thereof:

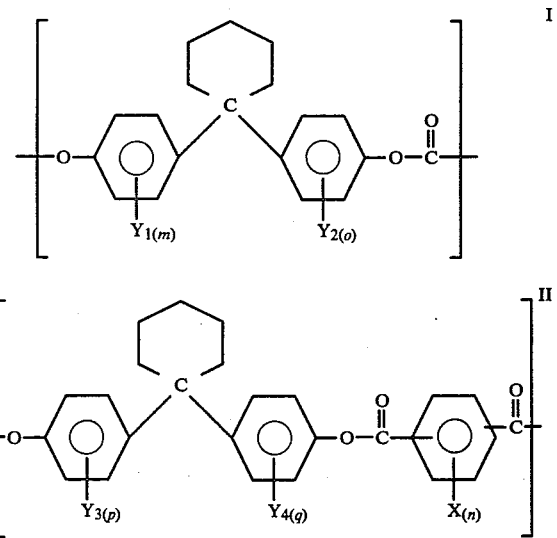

wherein X is independently selected from the group consisting of hydrogen, halogen and alkyl radical; Y, $Y_2$, $Y_3$ and $Y_4$ are the same or different and is an alkyl radical; m, o, p and q are the same or different and is 0, 1 or 2; n is an integer from 1 to 4; r is an integer from 2 to about 20.

2. The high molecular weight segment-ester polycarbonate of claim 1 wherein m, n, o, p and q are each zero.

3. The high molecular weight segment-ester polycarbonate of claim 1 wherein the alkyl radical is from 1 to 4 carbon atoms, inclusive.

4. The high molecular weight segment-ester polycarbonate of claim 1 wherein the aromatic diester units are derived from isophthalic acid.

5. The high molecular weight segment-ester polycarbonate of claim 1 wherein the aromatic diester units are derived from terephthalic acid.

6. The high molecular weight segment-ester polycarbonate of claim 1 wherein the aromatic diester units are derived from both isophthalic and terephthalic acid.

7. The high molecular weight segment-ester polycarbonate of claim 1 wherein the cyclic bisphenol is 4,4'-cyclohexylidenebisphenol.

8. The high molecular weight segment-ester polycarbonate of claim 1 wherein the composition comprises a molar ratio of about two bisphenol carbonate to about one bisphenol-ester unit.

9. The high molecular weight segment-ester polycarbonate of claim 1 wherein the composition comprises a molar ratio of about 1 bisphenol-carbonate to about 1 bisphenol-ester unit.

10. The high molecular weight segment-ester polycarbonate of claim 1 wherein the composition comprises a molar ratio of about 3 bisphenol carbonate to 1 bisphenol-ester unit.

11. The high molecular weight segment-ester polycarbonate of claim 1 wherein the composition has a glass transition temperature of from about 180° to about 210° C.

12. The high molecular weight segment-ester polycarbonate of claim 1 further comprising a blend with a polycarbonate to impart resistance to high heat distortion to said polycarbonate.

13. The high molecular weight segment-ester polycarbonate of claim 1 further comprising a blend with a polyester to impart resistance to high heat distortion to the polyester.

14. The high molecular weight aromatic segment-ester polycarbonate of claim 1 further comprising a blend with a segment-ester polycarbonate to impart resistance to high heat distortion to the copolyester-carbonate.

15. The high molecular weight aromatic segment-ester polycarbonate of claim 1, wherein the segment-ester polycarbonate includes alternating ester units and bisphenol-carbonate units.

16. The high molecular weight aromatic segment-ester carbonate of claim 1, wherein the segment-ester polycarbonate comprises a block copolymer.

* * * * *